Figure 1:
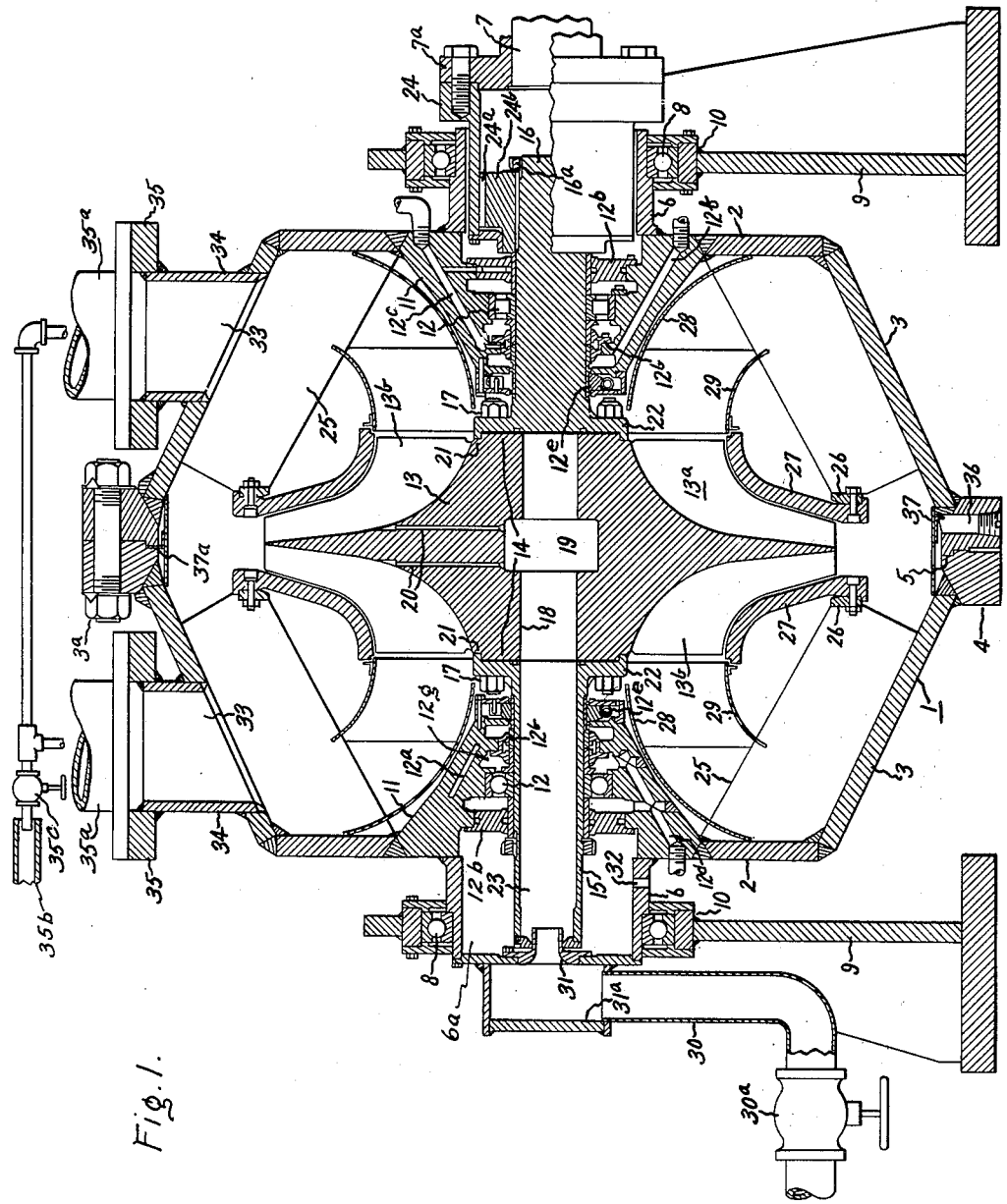

Jan. 9, 1951  E. E. STOECKLY  2,537,800
VARIABLE DENSITY FLUID ENERGY CONVERTER
Filed July 10, 1948  2 Sheets-Sheet 1

Inventor:
Eugene E. Stoeckly,
by Bowell S. Mack
His Attorney.

Patented Jan. 9, 1951

2,537,800

UNITED STATES PATENT OFFICE 2,537,800

VARIABLE DENSITY FLUID ENERGY CONVERTER

Eugene E. Stoeckly, Marblehead, Mass., assignor to General Electric Company, a corporation of New York Application July 10, 1948, Serial No. 38,113

1 Claim. (Cl. 188—90)

This invention relates to mechanical-hydraulic energy converting apparatus, particularly as applied to machines for testing prime movers, i. e. dynamometers for measuring the torque or power developed by prime movers.

In the testing of large steam or gas turbines, or other apparatus capable of developing large amounts of power, load devices for absorbing energy in excess of 3000 horsepower by means of water brakes, electric dynamometers, etc. are extremely difficult to obtain. In addition, many of these known machines are subject to the limitation that they are incapable of effective operation over a wide range of loads. This has presented an extremely serious problem for manufacturers attempting to do research and development relating to such prime movers. Interconnection with an electrical utility power system for the purpose of dissipating the energy developed by such prime movers is often impractical, not only because of the fluctuating speed and power characteristics of such loads during testing operations, but also due to the fact that the nature of the apparatus to be tested is such that connection to electrical loading devices is often impractical and sometimes impossible.

Accordingly, an object of the invention is to provide a mechanically simple and compact energy converter which may be readily designed to absorb loads up to and in excess of 35,000 horsepower, and which is capable of stable operation over a wide range of loads and speeds.

Another object of the invention is to provide an improved turbo-machine type of energy-absorbing apparatus.

A further object of the invention is to provide energy-converting apparatus of the type described in which erosion of the rotating parts due to the action of the circulating fluid is minimized.

Still another object of the invention is to provide an outer casing arrangement for a fluid energy converting machine which permits ease and accuracy of alignment, as well as of manufacture including assembly and disassembly.

A further object of the invention resides in the provision of an energy converter in which internal fluid-directing vanes serve the dual purpose of properly directing circulating fluid as well as cooperating with the outer casings of the energy converter to reduce the weight, mechanical complexity, and cost thereof.

A still further object of the invention is the provision of an improved fluid dynamometer in which a single rotor serves the triple purpose of (1) providing the braking or loading effect by its pumping action on a circulating fluid; (2) serving as convenient feed pump means for introducing working fluid into the dynamometer casing; and (3) the entering fluid also serving to cool the rotor.

Figure 2:
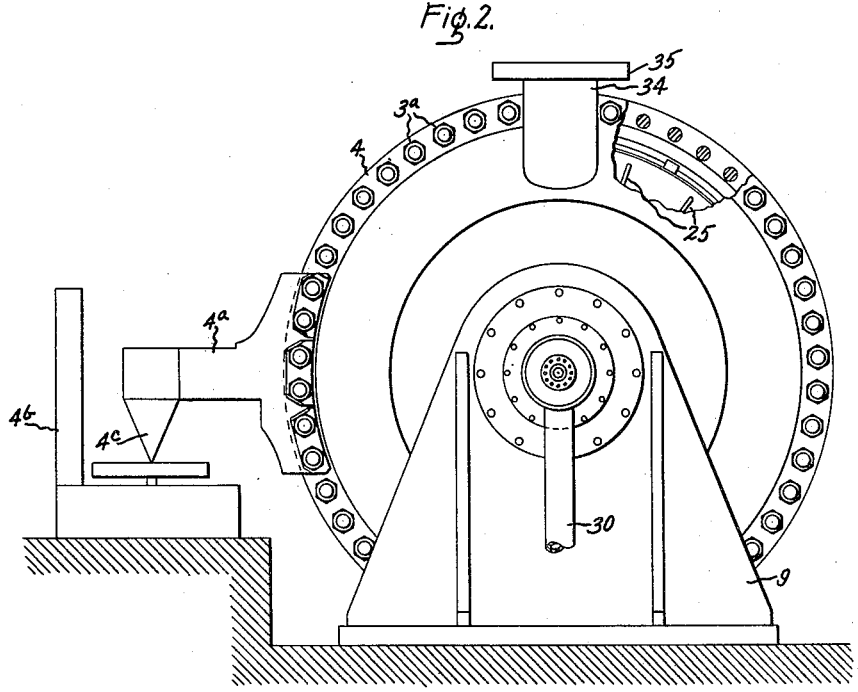

Other objects and advantages of the invention will be apparent from the following description taken in connection with the accompanying drawings, in which Fig. 1 is a sectional view of a dynamometer in accordance with the invention; and Fig. 2 is an exterior end view of the dynamometer casing.

Referring now to Fig. 1, a dynamometer casing is indicated generally at 1. To obtain high strength, freedom from mechanical complexity, to provide ease of manufacture, to facilitate assembly and disassembly, and to permit accuracy and ease of alignment, a split casing construction is employed, each half of which forms a frustum of a cone. A preferred construction of each casing half is as follows. An end wall 2 which may be cut circular in shape from suitable steel plate stock, is welded at its outer periphery to an axially and radially extending conical wall portion 3. In order to supply convenient means for attaching the two casing halves together, and for additional reasons which will appear later, a circumferential flange 4 is welded to the outer extremity of wall portion 3. The two casing halves may be secured together by means of suitable threaded fastenings, such as bolts 3a, to form the complete outer casing. To insure a high degree of accuracy in the alignment of one casing half with respect to the other, a rabbeted portion 5 is provided on a portion of the engaging surfaces of flanges 4.

In dynamometers of this type, it is customary to "cradle" the casing in suitable bearings, and to provide means for measuring the torque reaction imparted to the dynamometer casing. The torque measuring means may conveniently consist of a torque arm 4a, Fig. 2, bolted to the flange 4 and carrying an abutment 4c engaging a force measuring device, such as the platform scale 4b. Of course, many other well-known types of mechanical, hydraulic, or pneumatic devices can be used to measure the torque reaction.

Again referring to Fig. 1, a centrally located cylindrical member 6 is welded to the outer wall of each casing end disk 2. The cylindrical members 6 are supported by suitable anti-friction bearings 8. For reasons which will appear later, cylindrical member 6 is provided with a central bore 6a. The casing is "cradled" and supported by means of the bearings 8 carried by suitable pedestals 9, each having a suitable bearing housing 10. Each casing half is provided with a hollow conical bearing and shaft seal support member 11, which may be welded to end wall 2, and which extends axially to form a support for additional bearing means 12.

Bearings 12 serve to rotatably support the dynamometer rotor.

The system for supplying lubricant to bearings 12 may conveniently be of the type commonly known as "forced circulation" system. In such case, lubricant under pressure may be conveyed from a suitable source (not shown) to bearings 12 by means of passages 12a provided in the bearing support members 11. For reasons of clarity, a portion of only one of such passages is shown in the drawing. Passages 12g, in communication with 12a, serve to direct the lubricant against bearings 12. To prevent the leakage of lubricant from the casing, and for additional reasons which will appear later, seals 12b are provided on either side of the bearings 12. The seals may conveniently be of the type known as "labyrinth seals" and may also be pressurized by air under pressure supplied from a suitable source (not shown). The pressurized air may be conveyed to the seals by passages 12c provided in support members 11, which passages are arranged in communication with annular recesses in the seals 12b. After lubricating and cooling the bearings 12, the lubricant may be drained from the support member 11 through a drain passage 12d. In order to prevent mixing of the working fluid with the lubricant, additional sealing means 12e are provided. Seals 12e may conveniently be of the type known as "carbon seals," which are well known in the steam turbine art. A drain passage 12f is provided between seal 12e and the innermost lubricant seal 12b for the purpose of removing any working fluid or lubricant which may leak past their respective seals.

The rotor may consist of a double inlet centrifugal impeller 13 having a central hub portion 14 to either side of which are secured stub shafts 15, 16. As illustrated in Fig. 1, shafts 15, 16 may be secured to impeller 13 by threaded fastenings 17, but it will be appreciated by those skilled in the art that other arrangements for supporting the impeller on the shafts may be employed. Because of its balanced end thrust characteristics, I prefer to employ a dual inlet impeller of the "open" or unshrouded type. A central bore 18 extends through the impeller, and a second bore portion 19 of greater diameter forms a chamber at the center of the impeller. A plurality of circumferentially spaced radially extending passages 20 communicate with the radially extending fluid passages formed between adjacent impeller blades 13a and with the central chamber 19. The hub portions 14 of the impeller are provided with rabbeted faces 21 to insure proper alignment of shafts 15, 16. Shafts 15, 16 have flanged end portions 22 having rabbets which mate with the rabbets 21 on the faces of hubs 14. As noted previously, shaft 15 is provided with a bore 23 which communicates with the central chamber 19 in impeller 13. As illustrated in Fig. 1, shaft 16 is solid and thus serves to close one end of the impeller bore 18. At the outermost extremity of shaft 16, that is, at the right-hand end in the drawing, means are provided for connecting the dynamometer rotor to the prime mover to be tested. For the purpose of illustration, a flanged coupling sleeve 24 is shown having internal gear teeth 24a meshing with similar external teeth on a flange 24b, which may be splined or keyed to shaft 16 and secured by a retaining nut 16a. The coupling sleeve 24 may be secured to the prime mover shaft 7 by any suitable means such as a bolted flange 7a.

Disposed within the casing, are a plurality of circumferentially spaced, axially and radially extending vanes 25 which are welded to the cone members 3 and end disks 2, respectively. These vanes 25 have an axial length which is of the same order of magnitude as the impeller radius and they serve a dual purpose. They not only provide strength and rigidity to the dynamometer casing, but in addition they serve as flow directing vanes in, and partially define portions of the circulatory passages for the working fluid. To provide convenient supporting means for additional wall structure defining other portions of the circulatory passage, annular flanges 26 are provided, which may be welded to vanes 25. It will be seen that the flanges 26 provide convenient means for supporting annular wall members 27 which form close clearances with the impeller blades 13a. It will be apparent that the stationary wall 27, in cooperative relation with impeller 13, forms a shroud or outer boundary of the circulating passages formed between adjacent rotor blades 13a.

A further portion of the passage for the working fluid adjacent the impeller inlet is formed by coaxial curved walls 28, 29. Each of these walls defines a surface of revolution, and for convenience in manufacturing may be constructed from sheet metal which is suitable either for spinning or other forming operations. Curved walls 28, 29 may be supported in cooperative relation with impeller 13 and with vanes 25 by welding to these vanes or by any other convenient means of attachment. Slotted portions may be provided at the outer extremities of walls 28, 29 at a circumferential angular spacing corresponding to the spacing of vanes 25 to permit the insertion of vanes therein, as will be apparent from Fig. 1. It will now be apparent that two complete fluid circuits in parallel are defined by walls 2, 3, 27, 28, 29, and impeller 13.

A conduit 30 is provided for the purpose of conveying working fluid from a suitable source to the casing. It will be obvious to those skilled in the art that a flexible joint (not shown) may be provided in conduit 30, or the conduit itself may be constructed of flexible material such as rubber, to prevent undesirable torque reactions from being impressed upon the casing and thereby adversely affecting the accuracy of the torque measuring means. A valve 30a is provided in series flow relation with conduit 30 for controlling the rate of admission of the fluid. A nozzle 31 forms one wall of a fluid inlet chamber 31a which is welded to the end of cylindrical member 6. Nozzle 31 is adapted to inject working fluid from conduit 30 into the bore 23 of shaft 15. Since shaft 15 is a rotating member and the nozzle 31 is stationary, no pressure-tight fluid connection is provided between nozzle means 31 and the rotating shaft 15. However, the end portion of shaft 15 is arranged to form a close clearance with the external wall of the stationary nozzle 31 in order to minimize leakage to the interior 6a of cylindrical member 6. The small amount of leakage which may take place through this very small clearance space is not objectionable. This leakage may be permitted to collect in the interior 6a of the cylindrical member and may be drained therefrom by means of an opening 32. It will now be apparent that inlet conduit 30, nozzle 31, bore 23, 18, chamber 19, and radial passages 20 form a continuous passage for supplying "make-up" liquid to the working fluid circuit.

Means for the removal of fluid from the dynamometer casing are provided as follows. An opening 33 is provided in each half of the dynamometer casing and is adapted to receive a conduit 34. In order to provide a fluid-tight joint between the casing and conduit 34, these parts may be welded, which also provides mechanical strength and rigidity. Conduit 34 is provided with a flanged portion 35 to permit convenient attachment to conduits 35a. It is desired to particularly point out that the axis of the outlets 34 are arranged to extend in an exactly radial direction from casing wall 3 With this arrangement, and with the further provision that conduits 35a discharge directly to atmosphere or freely into an exhaust conduit 35b, as indicated in Fig. 1, there is no possibility of an erroneous torque measurement resulting from any kinetic reaction which may be imparted to the casing due to the flow of fluid through the exit conduits 34. A normally plugged drain opening 36 is provided in the flanged portion 4 of one half of the dynamometer casing to permit complete drainage of the working fluid from the casing during periods when the dynamometer is not in operation.

An annular deflecting plate or ring 37 is provided inside flanges 4, which ring extends completely around the inner periphery of the dynamometer casing and receives the impact of the fluid discharged from impeller 13 thereby preventing erosion of the mating portions of flanges 4. It will be apparent that the wear ring 37 may be readily replaced if it becomes badly eroded. The ring 37 is retained in the proper relation to the mating faces of flanges 4 by clips 37a which may be welded to the ring and inserted in a suitable clearance space provided between the mating flanges as indicated in Fig. 1.

In operation, the impeller 13 is driven by means of a prime mover (not shown) through the shaft 7. Working fluid, such as water, is supplied to the dynamometer by means of conduit 30. As previously indicated, valve 30a is provided in conduit 30 to control the rate of supply of working fluid to the dynamometer. From the inlet chamber 31a the fluid flows through nozzle 31 and the bore 23 of the rotating shaft 15, and finally into the central chamber 19 of impeller 13. The fluid is then pumped by centrifugal force through passages 20 into the impeller flow path. The usual working pressure of the fluid in the casing may be relatively high, perhaps of the order of 300#/sq. inch or more. It will be apparent that the arrangement described provides a very advantageous and convenient means for introducing "make-up" liquid into the dynamometer casing against the high working pressure therein, without the necessity of employing a separate feed pump. The arrangement has the further very great advantage that in addition to providing means for introducing the fluid into the casing, the flow of fluid through passages 20 effectively serves to cool the impeller. This is an important feature since it is often desirable to construct the highly-stressed impeller from a light alloy such as aluminum which rapidly loses its structural strength at elevated temperatures and, since the rotational speeds may be of the order of 8,000 R. P. M. or more, and the temperature of the working fluid may at various times be as high as or exceed 450° F.

As previously indicated, walls 2, 3, 27, 28, 29, and impeller 13 are arranged in cooperative relation to define two parallel circulatory passages for the working fluid. The fluid enters the impeller from the annular inlet passage defined by walls 28, 29 from the region adjacent the shaft flange 22 at relatively low velocity, and in a direction substantially parallel to the axis of rotation. In this region there is substantially no tangential component of velocity of the fluid entering the impeller due to the straightening action of vanes 25. After entering the impeller, the fluid flows through the impeller passages and, as will be appreciated by those skilled in the art, there is a very substantial energy transfer from the impeller to the fluid. It will also be appreciated that by virtue of this energy transfer from the impeller to the fluid, the velocity, pressure and temperature of the fluid are increased. The fluid is accelerated to an angular velocity corresponding substantially to that of the impeller and to some specific radial velocity at the point where it is discharged from the outer periphery of the impeller. Since similar action takes place on both sides of the impeller, the pressure forces acting in an axial direction are substantially balanced so that large capacity thrust bearings are not needed.

Upon leaving the impeller, the fluid is discharged against the deflecting ring 37, and a portion of the fluid is thereby deflected to the left and the remaining portion is deflected to the right of the central plane of the impeller. The fluid is then constrained to flow along walls 3, 2 after which it reenters the inlet passage defined by walls 28, 29. It will be appreciated by those skilled in the art that under practically all conditions of operation, the fluid leaving a centrifugal impeller will have a substantial tangential component of velocity when it impinges upon the deflecting ring 37. It has been found that for efficient pumping action of the impeller, it is desirable that the fluid enter the impeller with substantially axial velocity, free from any tangential or swirl component. Therefore, vanes 25 serve the useful and extremely important purpose of removing any swirl components of velocity before the fluid reenters the impeller as well as the more obvious function of adding strength and rigidity to the casing.

It is intended that the circulating working fluid will be a compressible or elastic fluid. However, the invention is not necessarily limited thereto. For the purpose of illustration it will be assumed that the working fluid is steam. In such case, ordinary water from city mains or other convenient source is supplied to conduit 30, and is pumped into the casing in the manner previously described. In passing through the impeller, energy is transferred to the fluid which raises its pressure, temperature, and velocity. It will be apparent that an additional increment of energy is added to the fluid each time it traverses the circulatory path through the impeller. Thus, there is a tendency for the pressure and temperature of the fluid to continually increase within the casing. This action continues until the water is vaporized into steam, which may be removed through conduits 35a at a rate controlled by a suitable valve 35c.

In a turbo-machine of this type, the energy-absorbing capacity is a function of the density of the working fluid, the rotational speed of the rotor, and the overall pressure drop around the fluid circuit. Control may be exercised over the power or load absorbing capacity of the machine by varying any of these quantities.

In order to accomplish control of the fluid density, the valve 35c is provided in conduit 34. Since, due to the action of the impeller upon the working fluid there is a resulting temperature rise and therefore, a tendency for the pressure within the dynamometer casing to increase, it will be apparent that by controlling the degree of opening of valve 35c so as to bleed a portion of the fluid from the casing, the pressure of the working fluid may be varied at will within very wide limits. It is to be noted, however, that steam valve 35c must be operated in proper coordination with liquid supply valve 30a. This is necessary since the quantity of working fluid bled from the casing through valve 35c must be replaced, in order to maintain equilibrium, by supplying a like quantity of fresh, cool, working fluid to the casing from conduit 30. This process of course tends to stabilize the temperature of the working fluid within the casing.

While the operation thus far has been described in terms of the working pressure of the fluid being at some value above atmospheric, it will be appreciated that conduit 35a may be connected to a suitable steam condenser, and the working fluid within the casing maintained at a pressure either above or below ambient to obtain still wider ranges of load absorbing capacity.

Further control over the inherent load absorbing capacity may be had by designing the fluid path so as to make the overall pressure drop around the fluid circuit any desired value. By varying either the pressure drop or the density of the working fluid, an extremely wide range of capacities may be obtained with turbo-machines of the general arrangement described.

As previously indicated, a preferred construction of the dynamometer employs a dual inlet centrifugal type impeller which tends to equalize the pressure forces acting upon the impeller in an axial direction. To further insure that such pressure forces do not become unbalanced, conduits 34 may be connected, externally of the casing, with pressure equalizing conduits 35a as shown in Fig. 1. Again, it is important to note that the common discharge conduit is arranged to discharge directly to atmosphere or freely into an exhaust conduit 35b, which in turn extends either in an exactly axial or an exactly radial direction, to prevent an erroneous torque measurement resulting from any kinetic reaction which may be imparted to the casing due to the flow of fluid through the common discharge conduit.

An important advantage of the invention resides in the fact that in passing through passages 20 in impeller 13 the entering liquid is accelerated to the same angular velocity as the impeller so that when this liquid enters the portion of the fluid circuit defined by blades 13a, the liquid has only a radial component of velocity relative to the impeller, that is, parallel to the blades. Thus the entering liquid has little erosive action on the impeller blades since it flows parallel with them, at low relative velocity, rather than impacting against them at high relative velocity. However, the invention is not limited to impellers having radial blades and it will be obvious to those skilled in the art that impellers having other blade shapes may be employed. Ordinarily, by the time the make-up liquid flows around the fluid circuit to the impeller inlet at least once, such liquid has vaporized to steam. Thus, the blade inlet portions 13b need work only on dry or superheated steam and are therefore spared the erosive action ordinarily encountered in other types of turbo-machines using liquid or steam containing entrained liquid particles.

It will be seen that the invention provides a relatively simple, inexpensive and compact fluid energy converter which, due to the use of high rotational speeds and/or high density, is capable of absorbing extremely large amounts of power; and the use of a variable density working fluid permits readily obtaining a wide range of loads at all speeds in a single unit. Furthermore, the construction and arrangement are such as to provide accuracy of alignment of critical parts, for ease of assembly and disassembly for servicing.

While a particular embodiment of the invention has been illustrated and described as applied to a fluid dynamometer, it will be apparent to those familiar with the art that the invention may be applied to other types of energy converters and that various changes and modifications may be made without departing from the invention, and it is intended to cover in the appended claim, all such changes and modifications as come within the true spirit and scope of the invention.

What I claim as new and desire to secure by Letters Patent of the United States is:

An energy converting machine comprising in combination, fluid energy converting means including a rotor secured to a shaft and adapted for operation at high rotational speeds; coupling means for connecting the shaft to a prime mover; means for pumping a vaporizable liquid into the machine and thereby simultaneously cooling the rotor; a casing comprising first and second, separable, juxtaposed, annular sections enclosing the rotor with the shaft projecting through an end wall of the casing; a rabbeted flange secured to each of said casing sections and adapted to define a sealed fluid joint when the casing sections are secured together; means for securing the casing sections together; an axially and circumferentially extending annular wall interposed between the sealed joint and the rotor and adapted to prevent the impact and erosive effect of the fluid discharged from the rotor upon the surfaces of said joint; second annular walls surrounding the rotor and defining an axial clearance therewith; radially and axially extending vane members having an axial length substantially equal to the radius of the rotor secured to the interior walls of the casing sections in circumferentially spaced relation, said inner walls of the casing, vane members, and second annular walls arranged in cooperative relation to define two closed fluid circuits in parallel from the exit to the inlet of the rotor within the casing; sealing means for preventing the flow of fluid along the shaft either outwardly from the casing or inwardly to the interior of the casing; and means for bleeding controllable quantities of fluid from the casing to control the pressure of the fluid therein.

EUGENE E. STOECKLY.

REFERENCES CITED

The following references are of record in the file of this patent:

UNITED STATES PATENTS

| Number | Name | Date |
| --- | --- | --- |
| 1,858,514 | Lell | May 17, 1932 |
| 2,189,189 | Bennett | Feb. 6, 1940 |
| 2,388,112 | Black et al. | Oct. 30, 1945 |
| 2,425,171 | Bennett et al. | Aug. 5, 1947 |

FOREIGN PATENTS

| Number | Country | Date |
| --- | --- | --- |
| 11,267 | Great Britain | May 10, 1911 |